July 5, 1938.   W. W. COWGILL   2,123,134
PROCESS OF TREATING FOOD MATERIALS
Filed Jan. 6, 1937
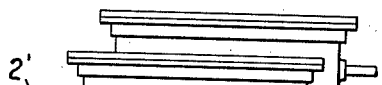

Patented July 5, 1938

2,123,134

UNITED STATES PATENT OFFICE 2,123,134

PROCESS OF TREATING FOOD MATERIALS

William W. Cowgill, Fairfield, Conn., assignor to Sardik Incorporated, Jersey City, N. J., a corporation of Delaware Application January 6, 1937, Serial No. 119,186

2 Claims. (Cl. 99—204)

This invention relates to the preparation of certain types of food material and to the subsequent treatment such as the drying thereof to render the material resistant to deterioration.

In the preparation of numerous products from natural food materials such as fruits and vegetables it is necessary to expose the inner structure thereof to the atmosphere thus subjecting the material to deleterious oxidation. Such oxidation with resulting discoloration takes place more rapidly with some fruits and vegetables than with others but generally the action is more rapid and more destructive with respect to finely divided material.

Efforts have been made to prevent such oxidation by performing the drying operation in an inert atmosphere of nitrogen or some other inert gas. While this has reduced oxidation somewhat the results have not been as satisfactory as desired, considerable oxidation being present in the finished material in spite of such use of inert gas.

An object of this invention is to provide a process of preparing and drying food materials, of such character as to produce a finished product substantially free of oxidation and discoloration.

A further object is to provide a process of preparing and drying food materials so that the finished product will be substantially free of oxidation and discoloration without the necessity of conducting the drying operation in a non-oxidizing atmosphere.

These and other objects are accomplished by the present invention which can be carried out in any suitable apparatus such, for example, as that shown diagrammatically in the accompanying drawing.

The present invention contemplates a preparatory treatment of the material of such character that substantially no oxidation or discoloration can occur while the material is being subjected to such preliminary operations as are required to condition it for whatever subsequent treatment is intended such, for example, as drying. In the present process the material is not only protected against oxidation resulting from direct contact with the atmosphere, but, where necessary, provision is made for likewise protecting it against oxidation resulting from such air or oxygen as may be incorporated or entrapped in the fresh or untreated material. By suitable control of the preparatory processes to which the material is subjected it can be maintained in substantially its original fresh condition and subjected to such a final treatment as, for example, drying without the freshness of the material or its food value, color, vitamin content or the like having been affected to any substantial degree by oxidation. If desired, it can be subjected to a drying operation in the presence of an inert gas as has been heretofore suggested, but the difficulties of drying in an inert atmosphere are manifold and render such an operation impractical from an economic and commercial view point due to the fact that in any drying operation carried on commercially large volumes of moisture are driven off from the material being dried and must be removed as rapidly as driven off. Obviously, the inert atmosphere into which the moisture is driven, when the drying operation is conducted in such an atmosphere, is removed with the moisture and the operation of separating such moisture from the inert gas and returning the latter to the drying chamber requires an expensive outlay of apparatus and considerably increases the cost of drying without any corresponding advantage in so far as the step of extracting moisture is concerned.

I prefer to provide a process of preparing the fresh material for such a subsequent treatment as drying in which the material is protected against any noticeable oxidation or the like during the preparatory steps and then subjecting the prepared, unoxidized, fresh material to a drying operation of such character that the moisture is reduced to the desired point and the material is rendered deterioration resistant so quickly as to substantially prevent oxidation during the drying treatment even though such treatment is conducted in the ordinary atmosphere.

While the present invention can be carried out with any desired apparatus the mechanism shown diagrammatically in the drawing is typical. The illustrated arrangement includes a hopper 1 of any desired size and construction which, if desired, can be sealed against the atmosphere after the material is placed therein. The hopper is connected through a valve-controlled line 2' with a source of inert gas such, for example, as a carbon dioxide tank 3. It is also connected through a second valve-controlled line 2 with a vacuum pump or similar apparatus (not shown) so that the air in the hopper can be evacuated prior to admitting inert gas thereto, should it seem desirable to do so. A feed worm 4, driven from any suitable source of power (not shown), is located in the bottom of the hopper and extends part way into a valve-controlled feed line 5 leading to a housing 6 within which is located a pulping mechanism 7 operated by a rotatable shaft 8 driven from any desired source of power. A stirring device 9 is also provided in the housing 6 for thoroughly mixing the pulped material. The pulping mechanism has a waste outlet 10 for discharging seeds, stems or the like which are separated from the pulp by such apparatus. A valve-controlled line 11 leads from the housing 6 to a distributing head 15, or the like, located near a distributing roller 15' and adjacent a drying surface which is illustrated as being formed by the outer face of an interiorly heated rotatable drum 16 having associated therewith a scraper or blade 17 for removing the dried material therefrom. The bottom of the pulper is preferably large enough to form a reservoir in which a suitable quantity of fresh pulp can be held to provide a constant supply for the distributing head regardless of the operation of the pulper.

In the drawing a second hopper 1 is shown which is also connected to the housing 6. The provision of two hoppers is desirable to permit the cleaning of one hopper without requiring any interruption to the process.

The pulping mechanism is connected to the carbon dioxide tank and to the source of vacuum by the valve-controlled lines 20 and 21, respectively.

The supply of gas from the tank 3 to the valve-controlled lines 2' and 20 leading to the hopper and pulper, respectively, is controlled by a main tank valve 22 connected to the valve-controlled lines through a union 23.

In accordance with the present invention the selected fruit or vegetable or any combination of fruits, or of vegetables, or of fruits and vegetables is cleaned and any stems or the like are removed. With some materials such as bananas the skins will also be removed, but with other materials such as apples the skins may, if desired, be left on the fruit and the whole fruit subjected to the process. The material may be cooked or uncooked as desired, but for the purposes of the process no cooking is required except that which may be necessary to soften such materials as apples, beets or the like sufficiently to permit the forming of a satisfactory pulp thereof. Apples, for example, are usually divided into approximately 8 or 10 pieces and are cooked in a steam kettle or the like sufficiently to soften them so that a suitable pulp can be easily prepared. Tomatoes, on the other hand, can be introduced directly into the hopper without any preliminary treatment other than that of washing and cleaning. Bananas can also be introduced directly into the pulping mechanism upon the removal of the skins. The material so prepared is placed in the hopper 1.

The material in the hopper is protected against oxidation by separating it from contact with the air. This can be done when it is not necessary to remove entrapped air and oxygen from the material, by introducing an inert gas into the hopper in such a way as to displace the air therefrom and to surround the material with such inert gas. At the same time, the air in other parts of the apparatus, such as the housing 6 is displaced by inert gas. In the illustrated embodiment this is accomplished by opening both the main valve 22 and the valves controlling the connecting lines between the tank 3 and the different parts of the apparatus. After the hopper and pulper are full of gas the main valve 22 is closed but the valves in the lines 2' and 20 are left open to provide a means for equalizing the pressure in the hopper and pulper so that the free flow of material will not be obstructed by any excess of pressure in the pulper.

When conditions are such that delivery of inert gas to the apparatus can not alone be depended upon to properly remove all air therefrom, or when the material is of such character as to contain a relatively large amount of entrapped air or oxygen, it may be desirable to subject the apparatus and the material therein to a vacuum before the inert gas is delivered thereto. Such a vacuum not only helps to remove air and oxygen from the different parts of the apparatus, but also effects the extraction of the greater proportion of any air or oxygen entrapped in the material.

As illustrated, this can be done by connecting the hopper 1 and the housing 6 with the vacuum pump or the like by opening the valves controlling the lines 2 and 21. Subsequently these lines are closed and the inert gas is admitted to the hopper and to the associated and connected apparatus from the tank 3 through the valve-controlled connections 2' and 20. Obviously, the use of the vacuum is optional.

After the material has thus been separated from any contact with the atmosphere and the apparatus has been filled with the inert gas, the material is fed by the worm 4 through the line 5 into the housing 6 where it is made into a pulp by the pulping mechanism 7, and the pulp so formed is thoroughly mixed by the stirring device 9. The pulp then flows through the valve-controlled line 11 and is delivered to the drying apparatus through the distributing head 15.

In order to avoid the necessity of conducting the drying operation in an inert atmosphere and at the same time to avoid oxidation of the material during the step of reducing the moisture content thereof, I employ a drying operation in which the extraction of moisture from the material is accomplished in such a way as to forestall substantially all oxidation thereof even though the drying is conducted in the ordinary atmosphere. The process of drying described in the Sartakoff Patent No. 1,908,489, May 9, 1933, is especially suitable for use in connection with the present invention.

In this drying operation the material is distributed by a suitable distributing mechanism such, for example, as the distributing head 15 and roller 15' over a heated drying surface in such a way as to disperse the particles of pulp on the surface so that substantially each particle is directly exposed to the drying heat and is not insulated therefrom by any substantial accumulation of intervening particles. As illustrated, the drying surface is the outer surface of an interiorly heated, rotating drum 16 on which the particles are dispersed by the distributing head and on which they are dried during the rotation thereof. The dried particles are removed by a suitable scraper 17 which is preferably of flexible steel pressed against the drying surface with sufficient pressure to insure a close contact across the entire surface so that the scraper removes all the material thereon as the drum rotates. The dispersed particles, the moisture content of which has been reduced to any predetermined point and preferably to between 3 and 6 per cent, are consolidated by the scraper 17 and form a thin film 18 of dried material in which the individual particles are held together by the natural binding substances of the original material and which moves across the blade and can be collected in any desired manner. By dispersing the particles over the drying surface in the manner described the moisture content is reduced to the desired point so quickly that the material is rendered deterioration resistant before any noticeable oxidation or discoloration occurs, and the moisture is driven off in such volume as to assist in keeping the material on the drum out of contact with air. The finished product is composed of particles having substantially the color, vitamin content, flavor and food value of the fresh material, and a moisture content such that it can be kept without substantial deterioration over prolonged periods of time.

I claim:

1. The improvement in the art of preparing a concentrated food product of reduced moisture content from material of cellular formation, which comprises charging the material, softened by cooking if necessary, into a receptacle, then filling said receptacle with an inert atmosphere, withdrawing the material from the receptacle without admitting air thereto and passing it out of contact with air to a second receptacle in which air has been replaced by an inert atmosphere and in such receptacle converting the material into a pulp containing finely divided particles of cellular material, withdrawing said material from said receptacle through a closed passage terminating in close proximity to a heated drying surface and then distributing the material over said surface to substantially separate said particles thereon so that each particle will be subjected to a substantially equal amount of heat, subjecting the particles in dispersed condition to heat sufficient to reduce the moisture content to a predetermined point so quickly as to forestall substantial oxidation thereof during the drying operation, and consolidating said particles at a temperature such that the constituent binding substances of the original material will hold said particles together.

2. The improvement in the art of preparing a concentrated food product of reduced moisture content from material of cellular formation, which comprises charging the material, softened by cooking if necessary, into a closed receptacle, evacuating the receptacle, thereafter filling it with an inert atmosphere, withdrawing the material from the receptacle without admitting air thereto and passing it out of contact with air to a second receptacle in which air has been replaced by an inert atmosphere and in said receptacle converting the material into a pulp containing finely divided particles of cellular material all without access of air thereto, withdrawing said material from said receptacle through a closed passage terminating in close proximity to a heated drying surface and then distributing the material over said surface to substantially separate said particles thereon so that each particle will be subjected to a substantially equal amount of heat, subjecting the particles in dispersed condition to heat sufficient to reduce the moisture content to a predetermined point so quickly as to forestall substantial oxidation thereof during the drying operation, and consolidating said particles at a temperature such that the constituent binding substances of the original material will hold said particles together.

WILLIAM W. COWGILL.